United States Patent
Choi et al.

(10) Patent No.: US 10,943,524 B2
(45) Date of Patent: Mar. 9, 2021

(54) DEVICE FOR RESTORING DATA BY USING A LINEAR FEEDBACK SHIFT REGISTER AND DATA TRANCEIVING SYSTEM INCLUDING THE DEVICE

(71) Applicant: SAMSUNG ELECTRONICS CO., LTD., Suwon-si (KR)

(72) Inventors: Dong-Chul Choi, Yongin-si (KR); Sung-Ho Kang, Hwaseong-si (KR); June-Hee Lee, Seongnam-si (KR); Han-Kyul Lim, Seoul (KR); Byung-Wook Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 16/427,856

(22) Filed: May 31, 2019

(65) Prior Publication Data
US 2019/0371227 A1 Dec. 5, 2019

(30) Foreign Application Priority Data
Jun. 4, 2018 (KR) .................... 10-2018-0064478

(51) Int. Cl.
*G06F 13/42* (2006.01)
*G09G 3/20* (2006.01)
*G06F 7/58* (2006.01)

(52) U.S. Cl.
CPC ........... *G09G 3/2092* (2013.01); *G06F 7/584* (2013.01); *G09G 2310/0286* (2013.01); *G09G 2310/08* (2013.01); *G09G 2330/06* (2013.01)

(58) Field of Classification Search
CPC .......... G06F 21/79; G06F 1/1626; G06F 3/12; G06F 3/14; G06F 7/584; G06F 9/30029; G06F 15/00; G06F 9/265; G06F 9/30101; G09G 2310/0281; G09G 2310/0286; G09G 2310/08; G09G 2330/06; G09G 2370/00; G09G 3/2092; G09G 5/00; H04L 43/0811;
(Continued)

(56) References Cited

U.S. PATENT DOCUMENTS

| 5,530,959 A | 6/1996 | Amrany |
| 7,035,412 B2 | 4/2006 | Lewis |
| 7,317,735 B1 | 1/2008 | Ojard |

(Continued)

FOREIGN PATENT DOCUMENTS

KR  10-2016-0131892  11/2016

*Primary Examiner* — Duc Q Dinh
(74) *Attorney, Agent, or Firm* — F. Chau & Associates, LLC

(57) ABSTRACT

A device for generating restoration data by descrambling scramble data includes a linear feedback shift register configured to receive a first clock including a plurality of edges and sequentially generate a plurality of seeds including first to N−1th seeds (where N is a natural number of 2 or greater) respectively corresponding to first to N−1th edges among the plurality of edges, a seed calculator configured to calculate an Nth seed corresponding to an Nth edge among the plurality of edges by using the first seed, and a descrambler configured to descramble the scramble data by using the plurality of seeds generated by the linear feedback shift register and the Nth seed calculated by the seed calculator. The linear feedback shift register is further configured to generate an N+1th seed by using the Nth seed.

20 Claims, 14 Drawing Sheets

(58) Field of Classification Search
CPC ............ H04L 43/0823; H04L 43/0852; H04L 7/0008; H04L 9/12
USPC .................................................. 345/87–100
See application file for complete search history.

(56) References Cited

U.S. PATENT DOCUMENTS

| | | | |
|---|---|---|---|
| 8,000,404 B2 * | 8/2011 | Talbot | H04L 25/085 375/285 |
| 9,432,187 B2 | 8/2016 | Newman | |
| 9,497,020 B1 * | 11/2016 | Ganfield | G06F 7/584 |
| 9,548,857 B2 | 1/2017 | Ganfield | |
| 9,792,246 B2 * | 10/2017 | Teoh | G06F 13/28 |
| 2012/0146989 A1 | 6/2012 | Whitby-Strevens | |
| 2012/0237036 A1 | 9/2012 | Dabak et al. | |
| 2016/0328567 A1 | 11/2016 | Chang et al. | |

* cited by examiner

FIG. 9A
| Sd1   | Sd2   | Sd3   | ··· | Sdn  |
|-------|-------|-------|-----|------|
| Sdn+1 | Sdn+2 | Sdn+3 | ··· | Sd2n |
| Sd2n+1| Sd2n+2| Sd2n+3| ··· | Sd3n |
FIG. 9B
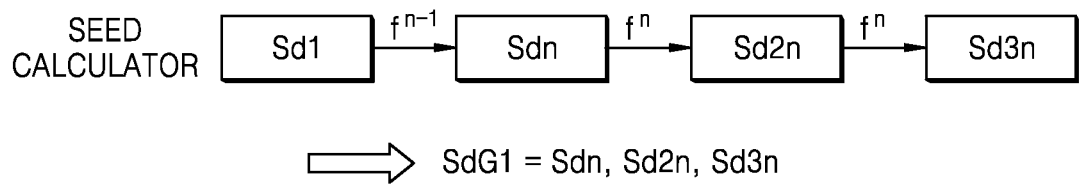
FIG. 9C
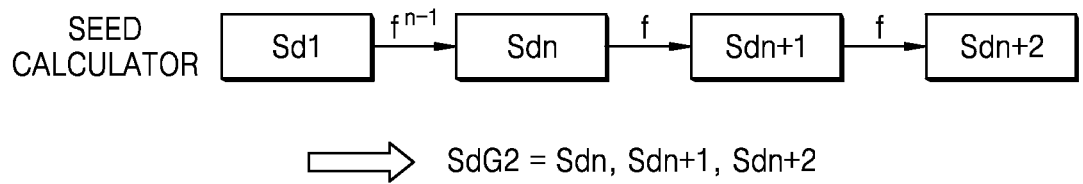

DEVICE FOR RESTORING DATA BY USING A LINEAR FEEDBACK SHIFT REGISTER AND DATA TRANCEIVING SYSTEM INCLUDING THE DEVICE

CROSS-REFERENCE TO RELATED APPLICATION

This application claims priority under 35 U.S.C. § 119 to Korean Patent Application No. 10-2018-0064478, filed on Jun. 4, 2018 in the Korean Intellectual Property Office, the disclosure of which is incorporated by reference herein in its entirety.

TECHNICAL FIELD

Exemplary embodiments of the inventive concept relate to a data receiving device and a data transceiving system including the same, and more particularly, to a device configured to restore original data by descrambling received data using a linear feedback shift register and a data transceiving system including the device.

DISCUSSION OF RELATED ART

Recently, to reduce weight and power consumption of a user device, a flat panel display device like a liquid crystal display (LCD) device is widely used instead of a cathode-ray tube (CRT) device. The flat panel display device includes a display panel displaying an image, and the display panel includes a plurality of pixels. The plurality of pixels are respectively arranged in areas in which multiple gate lines configured to select gates of the plurality of pixels cross multiple source lines configured to deliver color data (e.g, gradation data).

For displaying an image on the display panel, a control signal needs to be applied to the gate lines and image data is applied to the source lines. A display driver integrated circuit (DDI) or a system on chip (SOC) provides the control signal and the image data to the display panel. With regard to the display panel, the control signal and the image data provided to the display panel may be transmitted via a plurality of transmission lines. When the control signals transmitted by using the plurality of transmission lines overlap one another, an error may occur due to electromagnetic interference (EMI). Such an EMI may cause a problem in not only the display panel but also various devices configured to transceive data (e.g., a peripheral component interconnect (PCI), a modulator-demodulator (MODEM), etc.).

SUMMARY

According to an exemplary embodiment of the inventive concept, a device for generating restoration data by descrambling scramble data includes: a linear feedback shift register configured to receive a first clock including a plurality of edges and sequentially generate a plurality of seeds including first to N−1th seeds (where N is a natural number of 2 or greater) respectively corresponding to first to N−1th edges among the plurality of edges; a seed calculator configured to calculate an Nth seed corresponding to an Nth edge by using the first seed; and a descrambler configured to descramble the scramble data by using the plurality of seeds generated by the linear feedback shift register and the Nth seed calculated by the seed calculator. The linear feedback shift register is further configured to generate an N+1th seed by using the Nth seed.

According to an exemplary embodiment of the inventive concept, a data transceiving system includes: a first device configured to generate and output scramble data including first to Nth data (where N is a natural number of 2 or greater) by scrambling original data; and a second device configured to receive the scramble data and decode the scramble data into the original data by descrambling the scramble data. The second device includes: a linear feedback shift register configured to receive a first clock including a plurality of edges and sequentially generate a plurality of seeds including first to N−1th seeds (where N is a natural number of 2 or greater) respectively corresponding to first to N−1 edges among the plurality of edges; a seed calculator configured to calculate an Nth seed corresponding to an Nth edge among the plurality of edges by using the first seed; and a descrambler configured to descramble the scramble data by using the plurality of seeds generated by the linear feedback shift register and the Nth seed calculated by the seed calculator. The linear feedback shift register generates an N+1th seed by using the Nth seed.

According to an exemplary embodiment of the inventive concept, in a data descrambling method by which original data is decoded by descrambling scramble data including first data to Nth data (where N is a natural number), the method includes: generating a first seed to a k−1th seed respectively corresponding to the first data to k−1th data (where k is a natural number of N or less) by using a linear feedback shift register; calculating a kth seed by using the first seed; storing the kth seed in a memory; descrambling the first data to the k−1th data by using the first seed to the k−1th seed; descrambling the kth data by using the kth seed received from the memory; and generating a k+1th seed to an Nth seed from the kth seed received from the memory by using the linear feedback shift register. The linear feedback shift register generates the first seed to the k−1th seed by using a first function, and the calculating of the kth seed includes calculating the kth seed by substituting the first seed in the first function for k−1 times.

BRIEF DESCRIPTION OF THE DRAWINGS

The above and other features of the inventive concept will be more clearly understood by describing in detail exemplary embodiments thereof with reference to the accompanying drawings.

FIGS. 9A through 9C are diagrams illustrating an example of operation of a seed calculator of FIG. 8 according to an exemplary embodiment of the inventive concept.

DETAILED DESCRIPTION OF THE EMBODIMENTS

Figure 1:
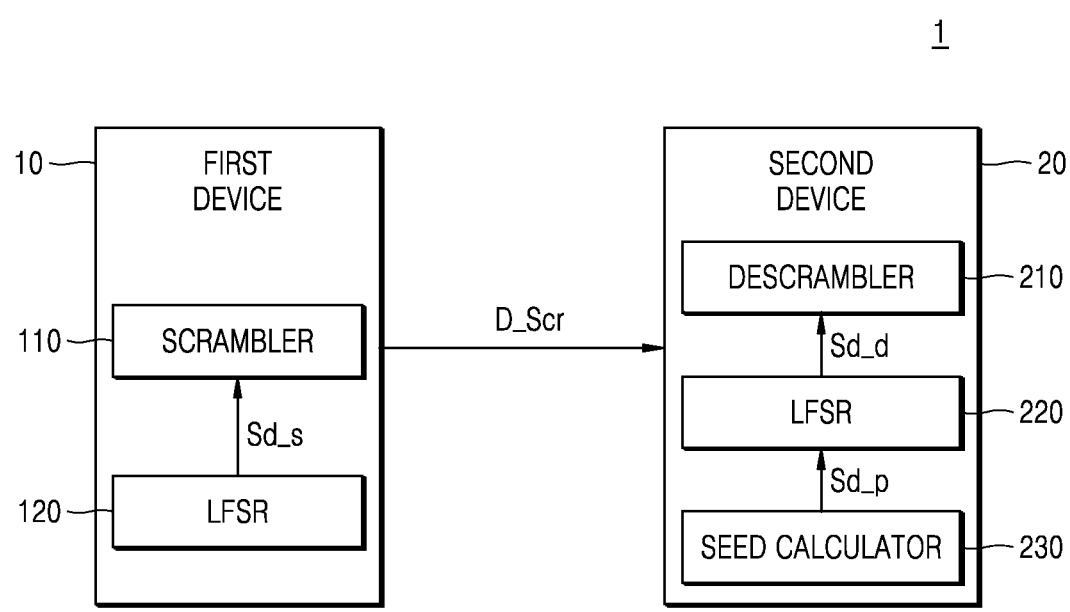
FIG. 1 is a block diagram of a data transceiving system according to an exemplary embodiment of the inventive concept.

Exemplary embodiments of the inventive concept provide a device for efficiently transceiving data despite electromagnetic interference (EMI) and a data transceiving system including the device.

Exemplary embodiments will be described more fully hereinafter with reference to the accompanying drawings. Like reference numerals may refer to like elements throughout this application.

FIG. 1 is a block diagram of a data transceiving system according to an exemplary embodiment of the inventive concept.

Referring to FIG. 1, a data transceiving system 1 may include a first device 10 and a second device 20. The first device 10 may include a scrambler 110 and a linear feedback shift register (LFSR) 120.

The LFSR 120 may sequentially generate a scrambling seed Sd_s based on a clock. The scrambler 110 may scramble original data based on the scrambling seed Sd_s received from the LFSR 120. According to an exemplary embodiment of the inventive concept, the scrambler 110 may scramble the original data by performing an exclusive or (XOR) operation on the scrambling seed Sd_s and the original data. The scrambler 110 may output scramble data D_Scr, generated by scrambling the original data, to the second device 20.

The second device 20 may include a descrambler 210, a linear feedback shift register (LFSR) 220, and a seed calculator 230. The LFSR 220 may sequentially generate a descrambling seed Sd_d based on the clock. The descrambler 210 may descramble the scramble data D_Scr based on the descrambling seed Sd_d received from the LFSR 220. According to an exemplary embodiment of the inventive concept, the descrambler 210 may descramble the scramble data D_Scr by performing an XOR operation on the descrambling seed Sd_d and the scramble data D_Scr.

According to an exemplary embodiment of the inventive concept, the LFSR 220 may generate the descrambling seed Sd_d that is identical to the scrambling seed Sd_s based on the clock. In detail, the LFSR 220 may sequentially generate the descrambling seed Sd_d that is identical to the scrambling seed Sd_s based on a rising edge or a falling edge of the clock. As an example, the scrambler 110 may generate first scramble data by scrambling the original data by using a first scrambling seed received from the LFSR 120, and the descrambler 210 may generate restoration data by descrambling the first scramble data by using a first descrambling seed received from the LFSR 220. Since the first scrambling seed is identical to the first descrambling seed, the generated restoration data is identical to the original data.

The seed calculator 230 may calculate a prediction seed Sd_p based on a valid seed and output the calculated prediction seed Sd_p to the LFSR 220. Due to a phenomenon like electromagnetic interference (EMI), etc., an error may occur in a clock used when the LFSR 220 generates the descrambling seed Sd_d. Since the LFSR 120 and the LFSR 220 operate based on clocks generated by different clock generators, when the clock used by the LFSR 220 malfunctions, the descrambler 210 may descramble the scramble data D_Scr by using the descrambling seed Sd_d that is different from the scrambling seed Sd_s. Accordingly, an error may occur where the original data scrambled by the first device 10 is different from the restoration data generated when the second device 20 performs descrambling.

With respect to a clock including a plurality of edges, the LFSR 220 may generate the descrambling seed Sd_d corresponding to a subsequent edge of a first edge of the clock based on the descrambling seed Sd_d corresponding to the first edge. Accordingly, when an error occurs in the first edge of the clock, the descrambling seed Sd_d after the first edge may be different from the scrambling seed Sd_s. Resultantly, after the first edge in which the error occurs, the restoration data descrambled by the descrambler 210 may be different from the original data.

According to an exemplary embodiment of the inventive concept, the seed calculator 230 may calculate the prediction seed Sd_p based on the valid seed and the LFSR 220 may generate the descrambling seed Sd_d with respect to subsequent clocks based on the prediction seed Sd_p. Accordingly, even after the first edge of the clock in which an error has occurred, the descrambling seed Sd_d after the prediction seed Sd_p may have a same value as that of the scrambling seed Sd_s without having to be interfered by the first device 10, and the restoration data having a same value as that of the original data may be generated.

Figure 2:
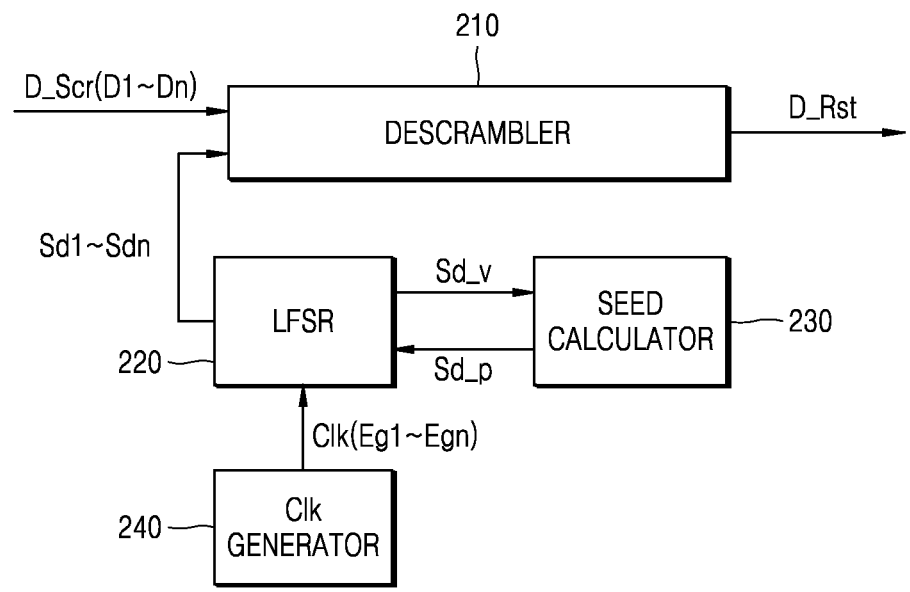
FIG. 2 is a block diagram of a device according to an exemplary embodiment of the inventive concept.

FIG. 2 is a block diagram of a device according to an exemplary embodiment of the inventive concept. Descriptions previously provided with reference to FIG. 1 are not provided here again.

Referring to FIG. 2, a device 20a may include the descrambler 210, the LFSR 220, the seed calculator 230, and the clock generator 240. The device 20a may correspond to the second device 20 of FIG. 1. The clock generator 240 may generate a clock Clk sequentially including first to nth edges Eg1 to Egn and output the clock Clk to the LFSR 220. The first to nth edges Eg1 to Egn may refer to a falling edge or a rising edge of the clock Clk generated by the clock generator 240. The LFSR 220 may sequentially generate a first seed Sd1 to an nth seed Sdn in correspondence with the first edge Eg1 to the nth edge Egn.

The LFSR 220 may generate a seed corresponding to a subsequent edge of a previous edge based on a seed corresponding to the previous edge. As an example, the LFSR 220 may generate a second seed Sd2 corresponding to a second edge Eg2 by using the first seed Sd1 corresponding to the first edge Eg1 and generate a third seed Sd3 corresponding to a third edge Eg3 by using the second seed Sd2. According to an exemplary embodiment of the inventive concept, the LFSR 220 may generate the second seed Sd2 by substituting the first seed Sd1 in a predetermined first function and generate the third seed Sd3 by substituting the second seed Sd2 in the predetermined first function. The LFSR 220 may sequentially output the generated first to nth seeds Sd1 to Sdn to the descrambler 210 in correspondence with the first to nth edges Eg1 to Egn.

In addition, the LFSR 220 may output a valid seed Sd_v to the seed calculator 230, and the seed calculator 230 may calculate the prediction seed Sd_p based on the valid seed Sd_v. According to an exemplary embodiment of the inventive concept, the seed calculator 230 may calculate the prediction seed Sd_p by repeatedly substituting the valid seed Sd_v in the predetermined first function. The seed calculator 230 may output the calculated prediction seed Sd_p to the LFSR 220. According to an exemplary embodiment of the inventive concept, the LFSR 220 may include a plurality of registers, and the seed calculator 230 may store the prediction seed Sd_p in a register corresponding to the prediction seed Sd_p.

The valid seed Sd_v may be a descrambling seed having the same value as that of a scrambling seed of a device configured to transmit descrambling data D_Scr without generating an error (e.g., the first device 10 of FIG. 1), among a plurality of seeds generated by the LFSR 220. According to an exemplary embodiment of the inventive concept, the seed calculator 230 may receive a plurality of valid seeds and generate a plurality of prediction seeds by using at least some of the plurality of valid seeds.

When the LFSR 220 receives the prediction seed Sd_p from the seed calculator 230, the LFSR 220 may generate a kth seed corresponding to the prediction seed Sd_p by using a value of the prediction seed Sd_p instead of using a k−1th seed corresponding to a previous edge. Accordingly, the LFSR 220 may output a value of the prediction seed Sd_p to the descrambler 210 and generate a k+1th seed by using the value of the prediction seed Sd_p. The descrambler 210 may receive the scramble data D_Scr including first data D1 to nth data Dn from outside (for example, the first device 10 of FIG. 1). Since the first data D1 to the nth data Dn may correspond respectively to the first seed S1 to the nth seed Sdn, the descrambler 210 may generate restoration data D_Rst by performing an XOR operation on each of the first data D1 to the nth data Dn and the first seed Sd1 to the nth seed Sdn based on the clock Clk.

FIG. 2 shows that the seed calculator 230 stores the prediction seed Sd_p in the LFSR 220. However, this is merely exemplary. According to an exemplary embodiment of the inventive concept, the seed calculator 230 may output the prediction seed Sd_p directly to the descrambler 210, and the descrambler 210 may descramble the scramble data D_Scr by using the received prediction seed Sd_p.

Figure 3:
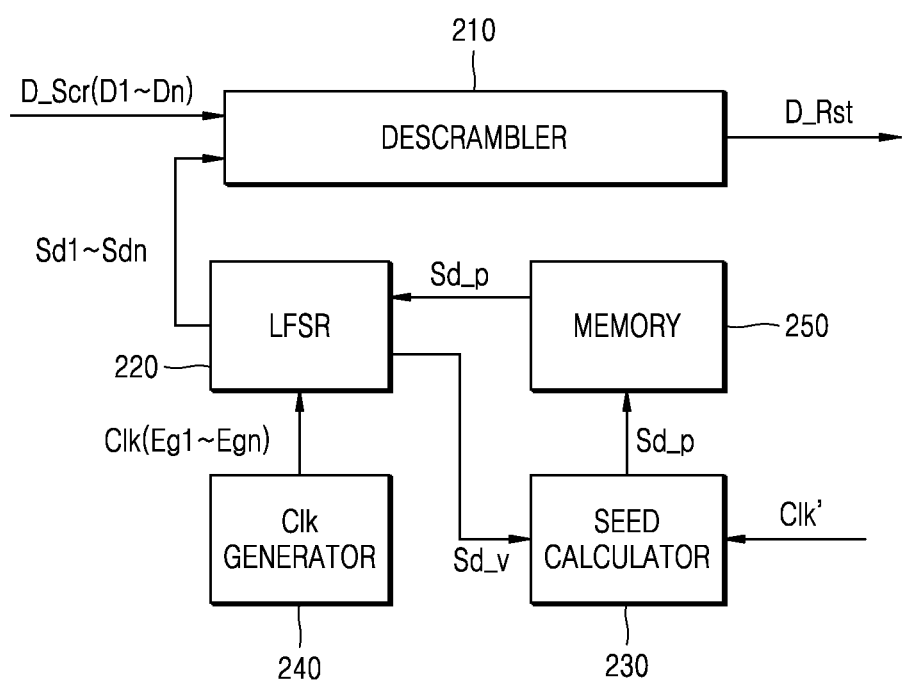
FIG. 3 is a block diagram of the device according to an exemplary embodiment of the inventive concept.

FIG. 3 is a block diagram of a device according to an exemplary embodiment of the inventive concept. Descriptions provided with reference to FIG. 2 are not provided here again.

Referring to FIG. 3, a device 20b may include the descrambler 210, the LFSR 220, the seed calculator 230, the clock generator 240, and a memory 250. The device 20b may correspond to the second device 20 of FIG. 1.

The seed calculator 230 may calculate the prediction seed Sd_p based on the valid seed Sd_v received from the LFSR 220 and store the calculated prediction seed Sd_p in the memory 250. According to an exemplary embodiment of the inventive concept, the seed calculator 230 may calculate the prediction seed Sd_p based on a difference between numbers of edges of the clock Clk of the valid seed Sd_v and the prediction seed Sd_p. The seed calculator 230 may generate the prediction seed Sd_p by repeatedly substituting the valid seed Sd_v in a first function used by the LFSR 220 in correspondence with the difference between the numbers of the edges of the valid seed Sd_v and the prediction seed Sd_p.

According to an exemplary embodiment of the inventive concept, the seed calculator 230 may count the difference between the numbers of the edges of the valid seed Sd_v and the prediction seed Sd_p by using a separate clock Clk' instead of the clock generator 240. Since the separate clock Clk' is not generated by the clock generator 240, even when the clock generator 240 malfunctions due to EMI, an error may not occur in the separate clock Clk'. Accordingly, even when the EMI occurs in the clock generator 240, the prediction seed Sd_p may have an accurate value in which an error does not occur.

According to an exemplary embodiment of the inventive concept, the seed calculator 230 may calculate a natural number N predetermined when the prediction seed Sd_p is calculated. The seed calculator 230 may generate the prediction seed Sd_p by repeatedly substituting for N times the valid seed Sd_v in the first function used by the LFSR 220.

The seed calculator 230 may store the prediction seed Sd_p in the memory 250. Based on the separate clock Clk', the seed calculator 230 may output the prediction seed Sd_p stored in the memory 250 to the LFSR 220 at an edge corresponding to the prediction seed Sd_p. When the LFSR 220 receives the prediction seed Sd_p, a kth seed corresponding to the prediction seed Sd_p may be generated by using a value of the prediction seed Sd_p, instead of a k−1th seed corresponding to a previous edge of the edge corresponding to the prediction seed Sd_p. Accordingly, the LFSR 220 may output a value of the prediction seed Sd_p to the descrambler 210 and generate a k+1th seed by using the value of the prediction seed Sd_p.

According to an exemplary embodiment of the inventive concept, the seed calculator 230 may determine whether the valid seed Sd_v received from the LFSR 220 is valid, and when the valid seed Sd_v is valid, store the valid seed Sd_v in the memory 250. This will be described later with reference to FIG. 10.

Figure 4:
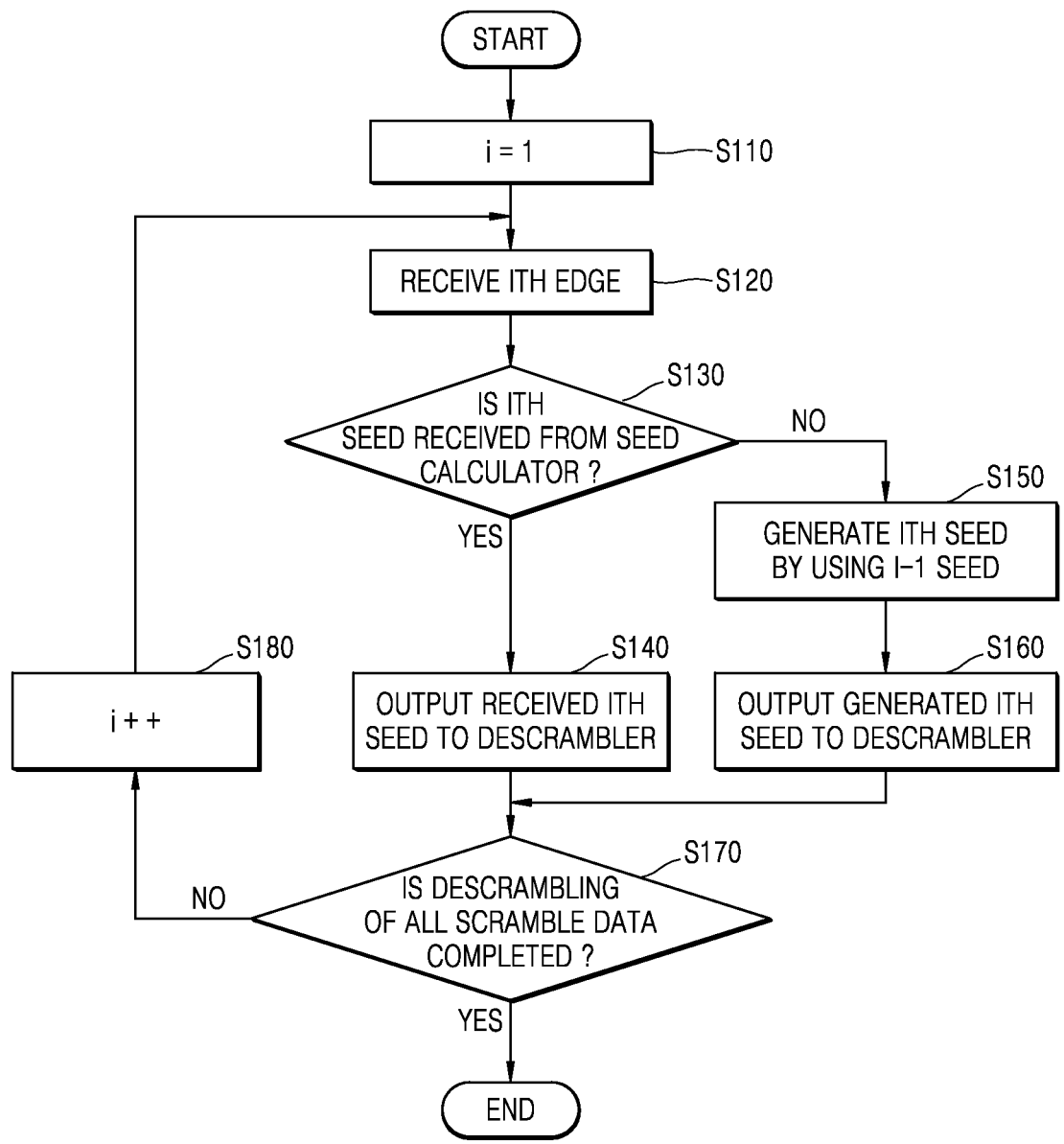
FIG. 4 is a flowchart of operation of a linear feedback shift register of FIG. 2 according to an exemplary embodiment of the inventive concept.

FIG. 4 is a flowchart of operation of an LFSR of FIG. 2 according to an exemplary embodiment of the inventive concept.

Referring to FIGS. 2 and 4, an initial value '1' may be substituted in a flag value i (in operation S110). The LFSR 220 may receive an ith edge of a clock (in operation S120). The LFSR 220 may determine whether an ith seed corresponding to the ith edge of the clock is received as the prediction seed Sd_p from the seed calculator 230 (in operation S130). As an example, the LFSR 220 may include a plurality of registers and the seed calculator 230 may store the prediction seed Sd_p in a register corresponding to the ith seed among the plurality of registers. The LFSR 220 may determine whether the ith seed is received from the seed calculator 230 based on whether the prediction seed Sd_p is stored in the register corresponding to the ith seed.

When the ith seed is received as the prediction seed Sd_p from the seed calculator 230, the LFSR 220 may output the received ith seed to the descrambler 210 (in operation S140).

Otherwise, when the ith seed is not received as the prediction seed Sd_p from the seed calculator 230, the LFSR 220 may generate the ith seed by using an i−1th seed that is a previous seed of the ith seed (in operation S150). The LFSR 220 may output the generated ith seed to the descrambler 210 (in operation S160). The LFSR 220 may determine whether descrambling of all the scramble data D_Scr is completed (in operation S170). When the descrambling of all the scramble data D_Scr is not completed, the LFSR 220 may increase i by 1 (in operation S180), and then, perform operations S120 to S170 again.

Otherwise, when the descrambling of all the scramble data D_Scr is completed, the LFSR 220 may finish operation thereof. As an example, when the descrambling of all the scramble data is ended, the clock generator 240 may not further output the clock Clk to the LFSR 220. When the clock Clk is not received from the clock generator 240, the LFSR 220 may determine that the descrambling is completed.

In an example in which first to third data is received as the scramble data D_Scr and a seed received from the seed calculator 230 is a second seed, the LFSR 220 may receive a first edge of a clock (in operation S120). The LFSR 220 may determine whether a first seed corresponding to the first edge is received as the prediction seed Sd_p from the seed calculator 230 (in operation S130).

Since the first seed is not received as the prediction seed Sd_p from the seed calculator 230, the LFSR 220 may generate the first seed by using a previous seed of the first seed (in operation S150), The LFSR 220 may output the generated first seed to the descrambler 210 (in operation S160). The LFSR 220 may determine whether descrambling of all the scramble data D_Scr is completed (in operation S170). Since the descrambling of all the scramble data D_Scr is not completed, the LFSR 220 may receive a second edge of the clock (in operation S120).

The LFSR 220 may determine whether a second seed corresponding to the second edge is received as the prediction seed Sd_p from the seed calculator (in operation S130). Since the second seed is received as the prediction seed Sd_p from the seed calculator 230, the LFSR 220 may output the received second seed to the descrambler 210 (in operation S160). The LFSR 220 may determine whether the descrambling of all the scramble data D_Scr is completed (in operation S170). Since the descrambling of all the scramble data D_Scr is not completed, the LFSR 220 may receive a third edge of the clock (in operation S120).

The LFSR 220 may determine whether a third seed corresponding to the third edge is received as the prediction seed Sd_p from the seed calculator 230 (in operation S130). Since the third seed is not received as the prediction seed Sd_p from the seed calculator 230, the LFSR 220 may generate the third seed by using the second seed that is a previous seed of the third seed received from the seed calculator 230 (in operation S150). The LFSR 220 may output the generated third seed to the descrambler 210 (in operation S160). The LFSR 220 may determine whether the descrambling of all the scramble data D_Scr is completed (in operation S170). Since the descrambling of the scramble data D_Scr that is the first to third data is completed, the LFSR 220 may end operation thereof.

Figure 5:
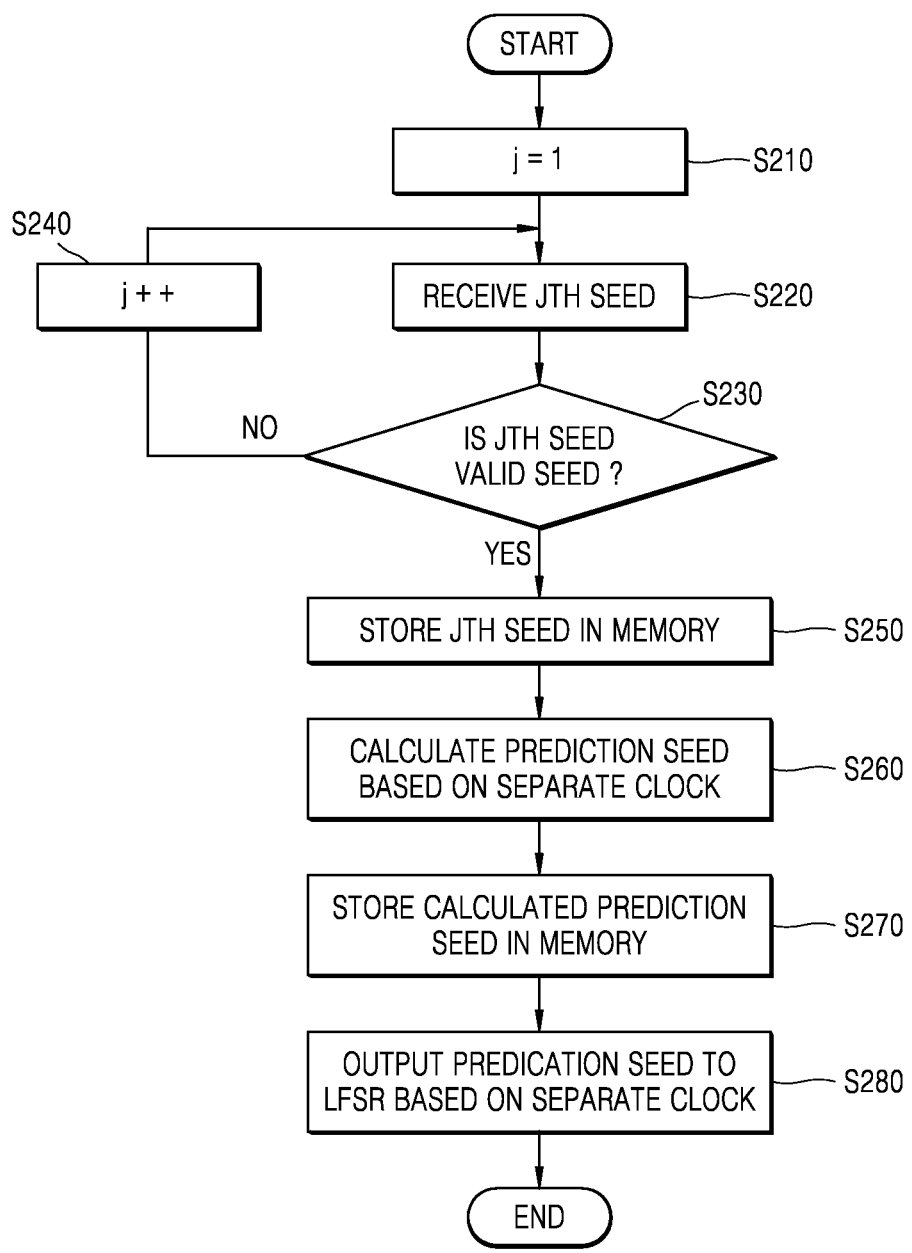
FIG. 5 is a flowchart of operation of a seed calculator of FIG. 3 according to an exemplary embodiment of the inventive concept.

FIG. 5 is a flowchart of operation of a seed calculator of FIG. 3 according to an exemplary embodiment of the inventive concept.

Referring to FIGS. 3 and 5, an initial value '1' may be substituted in a flag value j (in operation S210), and the seed calculator 230 may receive a jth seed as the valid seed Sd_v (in operation S220). The seed calculator 230 may determine whether the received jth seed is a valid seed (in operation S230). As an example, the seed calculator 230 may determine whether the received jth seed is a valid seed by using a method selected from an 8b/10b error, a symbol lock, etc. When the jth seed is not a valid seed, after the flag value j is increased by 1 (in operation S240), the seed calculator 230 may receive the jth seed again (in operation S220) and determine whether the jth seed is a valid seed (in operation S230).

Otherwise, when the jth seed is a valid seed, the seed calculator 230 may store the jth seed in the memory 250 and calculate the prediction seed Sd_p from the jth seed (in operation S260) based on a separate clock (in operation S260). According to an exemplary embodiment of the inventive concept, the seed calculator 230 may calculate the prediction seed Sd_p based on a difference between numbers of edges of clocks of the jth seed and the prediction seed Sd_p. The seed calculator 230 may generate the prediction seed Sd_p by repeatedly substituting the jth seed in the first function used by the LFSR 220 in correspondence with a difference between the numbers of the edges of the jth seed and the prediction seed Sd_p. According to an exemplary embodiment of the inventive concept, the seed calculator 230 may generate the prediction seed Sd_p by repeatedly substituting the jth seed in the first function used by the LFSR 220 for the predetermined natural number N times.

The seed calculator 230 may store the calculated prediction seed Sd_p in the memory 250 (in operation S270). The seed calculator 230 may output the prediction seed Sd_p to the LFSR 220 based on the separate clock (in operation S280).

Figure 6:
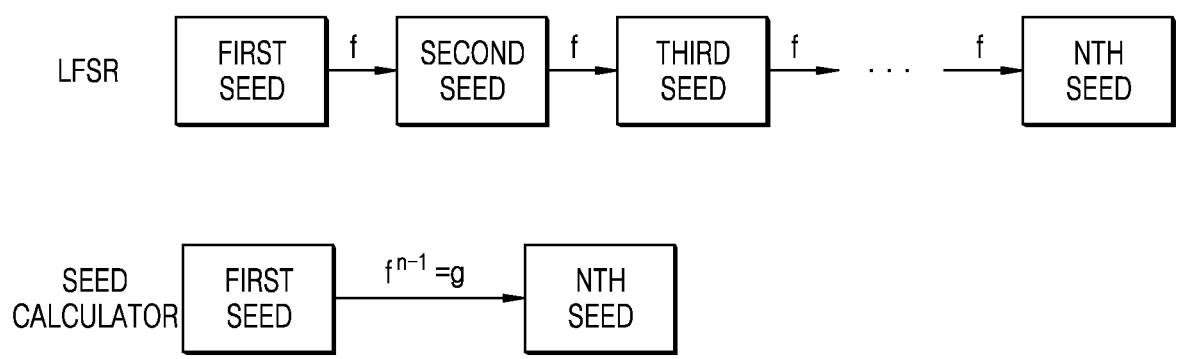
FIG. 6 is a diagram illustrating a method of calculating a prediction seed according to an exemplary embodiment of the inventive concept.

FIG. 6 is a diagram illustrating a method of calculating a prediction seed, according to an exemplary embodiment of the inventive concept.

Referring to FIGS. 2 and 6, the LFSR 220 may generate a second seed corresponding to a second edge that is a subsequent edge of a first edge of a clock by substituting a first seed corresponding to the first edge of the clock in a first function f. In addition, the LFSR 220 may generate a third seed corresponding to a third edge that is a subsequent edge of the second edge by substituting the second seed corresponding to the second edge in the first function f. As described above, the LFSR 220 may generate the first to nth seeds by substituting a seed corresponding to a previous seed in the first function f.

The seed calculator 230 may generate an nth seed by repeatedly substituting the first seed in the first function f for n−1 times. As an example, the first function f may be implemented in the form of a matrix multiplied by the first seed, and the seed calculator 230 may calculate the nth seed by multiplying the first seed by a second function g obtained by raising a matrix corresponding to the first function f to the power of n−1.

Figure 7A:
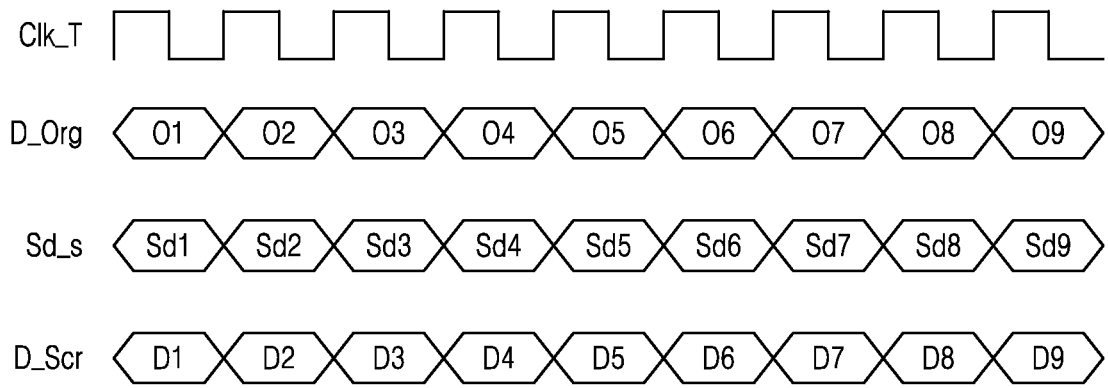
FIGS. 7A and 7B are timing diagrams illustrating data transception according to an exemplary embodiment of the inventive concept.
Figure 7B:
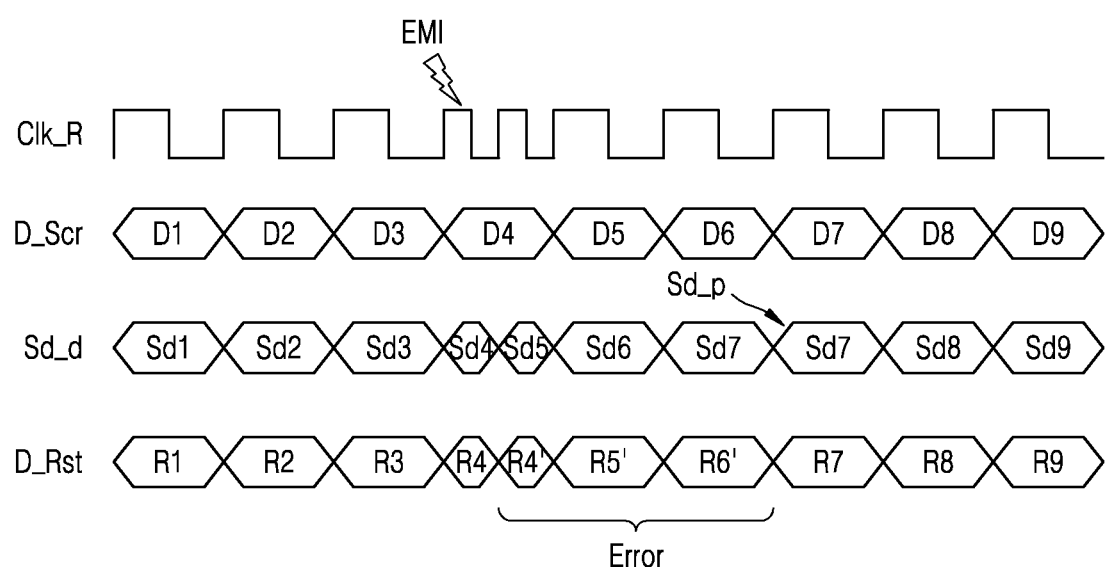

FIGS. 7A and 7B are timing diagrams illustrating data transception according to an exemplary embodiment of the inventive concept. In detail, FIG. 7A shows an exemplary embodiment in which the first device 10 scrambles original data D_Org based on the scrambling seed Sd_s. FIG. 7B shows an exemplary embodiment in which the second device 20 generates the restoration data D_Rst by descrambling scramble data D_Scr based on the descrambling seed Sd_d.

Referring to FIGS. 1 and 7A, the scrambler 110 may generate the scramble data D_Scr by performing an XOR operation on the original data D_Org and the scrambling seed Sd_s. The original data D_Org may include first to nth original data O1 to O9. The scrambling seed Sd_s may include the first seed Sd1 to a ninth seed Sd9 that sequentially changes according to a rising edge of a transmission clock Clk_T. The LFSR 120 may generate the scramble data D_Scr including the first data D1 to ninth data D9 by performing an XOR operation on each of the first to ninth original data O1 to O9 and the first to ninth seeds Sd1 to Sd9.

Referring to FIGS. 1 and 7B, the descrambler 210 may generate the restoration data D_Rst by performing an XOR operation on the scramble data D_Scr and the descrambling seed Sd_d. The descrambling seed Sd_d may include a first seed Sd1 to a ninth seed Sd9 that sequentially changes according to a rising edge of a reception clock Clk_R. The descrambling seed Sd_d may have a same value as that of the scrambling seed Sd_s in correspondence with the same rising edges of the transmission clock Clk_T and the reception clock Clk_R. The descrambler 210 may generate first restoration data R1 to third restoration data R3 by performing an XOR operation on each of the first data D1 to third data D3 and the first seed Sd1 to third seed Sd3. Since the first restoration data R1 to third restoration data R3 are descrambled by using the first seed Sd1 to third seed Sd3 that are the same as the scrambling seed Sd_s used when the scrambler 110 performs scrambling, the first restoration data R1 to third restoration data R3 may have the same values as those of the first original data O1 to third original data O3.

The EMI may occur in a process of descrambling fourth data D4. Accordingly, two rising edges may occur when the fourth data D4 is descrambled. Resultantly, although fourth restoration data R4 is generated as the fourth data D4 is descrambled by the fourth seed Sd4 before the EMI occurs, fourth error data R4' may occur as the fourth data D4 is descrambled by a fifth seed Sd5 after the EMI occurs. Since the fourth error data R4' is a value obtained by descrambling the fourth data D4 by using the fifth seed Sd5, the fourth error data R4' may be different from the fourth original data O4 scrambled by using the fourth seed Sd4.

In addition, since the descrambling seed Sd_d sequentially varies according to each subsequent rising edge, fifth data D5 may be descrambled by a sixth seed Sd6 and sixth data D6 may be descrambled by a seventh seed Sd7. Accordingly, fifth error data R5' that is different from fifth original data O5 may be generated and sixth error data R6' that is different from sixth original data O6 may be generated.

According to an exemplary embodiment of the inventive concept, the seed calculator 230 may calculate the prediction seed Sd_p based on a separate clock, and the descrambler 210 may descramble the scramble data D_Scr based on the prediction seed Sd_p. In an example of FIG. 7B, the valid seed Sd_v may be the first seed Sd1 and the prediction seed Sd_p may be the seventh seed Sd7. The seed calculator 230 may count '7' that is a number of edges from the first seed Sd1 to the seventh seed Sd7 based on edges corresponding to the seventh seed Sd7 and the first seed Sd1 based on the separate clock, and calculate the seventh seed Sd7 as the prediction seed Sd_p by substituting the first seed Sd1 in a predetermined function for '7−1' times. The LFSR 220 may receive the seventh seed Sd7 as the prediction seed Sd_p. The descrambler 210 may descramble the seventh data D7 based on the seventh seed Sd7 that is the received prediction seed Sd_p. Accordingly, in spite of the EMI that previously occurred, the seventh data D7 may be descrambled as the seventh restoration data R7 having the same value as that of the seventh original data O7 by using the seventh seed Sd7.

In addition, since the LFSR 220 generates a subsequent descrambling seed Sd_d based on the prediction seed Sd_p, eighth data D8 and ninth data D9 may also be descrambled as eighth restoration data R8 having the same value as that of eighth original data O8 and ninth restoration data R9 having the same value as that of ninth original data O9. Thus, as described above, according to an exemplary embodiment of the inventive concept, in spite of EMI, effective data descrambling may be performed by using the prediction seed Sd_p.

Figure 8:
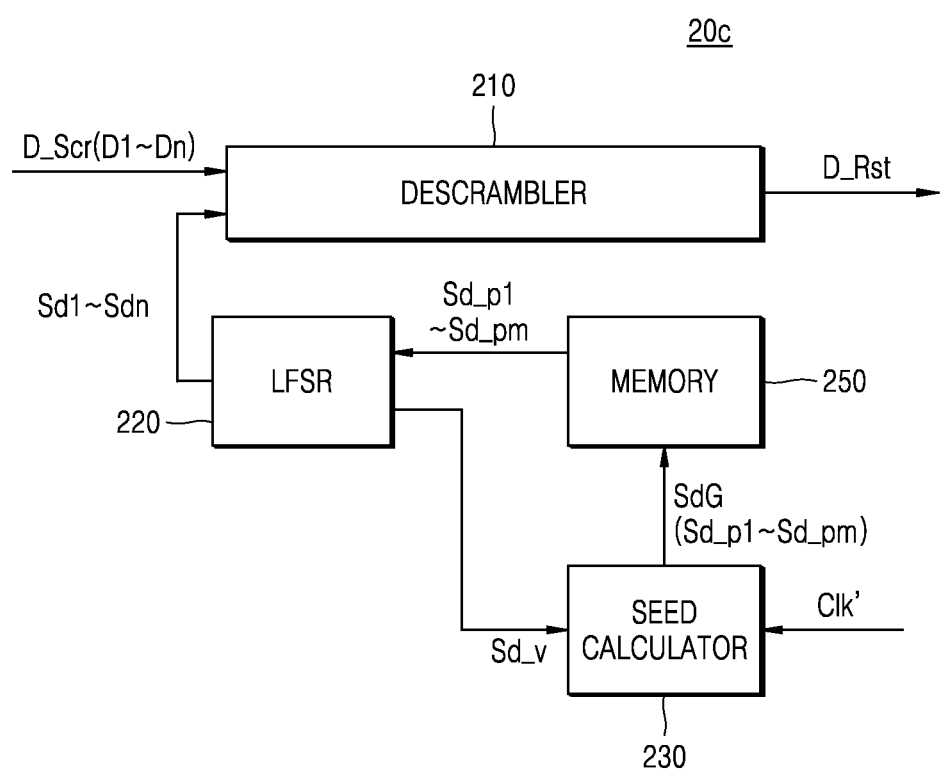
FIG. 8 is a block diagram of a device according to an exemplary embodiment of the inventive concept.

FIG. 8 is a block diagram of a device according to an exemplary embodiment of the inventive concept. In detail, FIG. 8 shows an exemplary embodiment in which the seed calculator 230 calculates a prediction seed group SdG including a plurality of prediction seeds Sd_p1 to Sd_pm. Descriptions provided with reference to FIG. 3 are not provided here again.

Referring to FIG. 8, a device 20c may include the descrambler 210, the LFSR 220, the seed calculator 230, the clock generator 240, and the memory 250. The device 20c may correspond to the second device 20 of FIG. 1.

The seed calculator 230 may calculate the prediction seed group SdG including the plurality of prediction seeds Sd_p1 to Sd_pm based on the valid seed Sd_v received from the LFSR 220 and store the calculated prediction seed group SdG in the memory 250. The seed calculator 230 may output the first prediction seed Sd_p1 to an mth prediction seed Sd_pm included in the prediction seed group SdG to the LFSR 220 based on the separate clock Clk'. The LFSR 220 may output the received first prediction seed Sd_p1 to the mth prediction seed Sd_pm to the descrambler 210 and generate a plurality of descrambling seeds based on the first to mth prediction seeds Sd_p1 to Sd_pm.

FIGS. 9A through 9C are diagrams illustrating an example of operation of a seed calculator of FIG. 8 according to an exemplary embodiment of the inventive concept. In detail, FIG. 9A is a table showing descrambling seeds according to an order of data. FIGS. 9A and 9C are diagrams illustrating exemplary embodiments of generating prediction seed groups by using different methods.

Referring to FIGS. 8, 9A, and 9B, a descrambling seed may sequentially include the first seed Sd1 to a 3nth seed Sd3n according to an order of data. The seed calculator 230 may calculate the nth seed Sdn by repeatedly substituting the first seed Sd1 in the first function f for n−1 times. In addition, the seed calculator 230 may calculate a second function f'' obtained by raising the first function f to an nth power and calculate a 2nth seed Sd2n by substituting the nth seed Sdn in the second function f''. In addition, the seed calculator 230 may calculate the 3nth seed Sd3n by substituting the calculated 2nth seed Sd2n in the second function f''. The seed calculator 230 may generate the nth seed Sdn, the 2nth seed Sd2n, and the 3nth seed Sd3n as a first prediction seed group SdG1 and store the generated first prediction seed group SdG1 in the memory 250.

Referring to FIGS. 8, 9A, and 9C, the seed calculator 230 may calculate the nth seed Sdn by repeatedly substituting the first seed Sd1 in the first function f for n−1 times. In addition, the seed calculator 230 may calculate an n+1th seed Sdn+1 by substituting the nth seed Sdn in the first function f. The seed calculator 230 may calculate an n+2th seed Sdn+2 by substituting the calculated n+1th seed Sdn+1 in the first function f. The seed calculator 230 may generate the nth seed Sdn, the n+1th seed Sdn+1, and the n+2th seed Sdn+2 as a second prediction seed group SdG2 and store the generated second prediction seed group SdG2 in the memory 250.

FIGS. 9A to 9C illustrate an exemplary embodiment of generating 3 seeds arranged with a constant space therebetween as a prediction group. However, this is only an example. The prediction seed group may include 3 or more seeds or a plurality of seeds arranged with a non-constant space therebetween.

Figure 10:
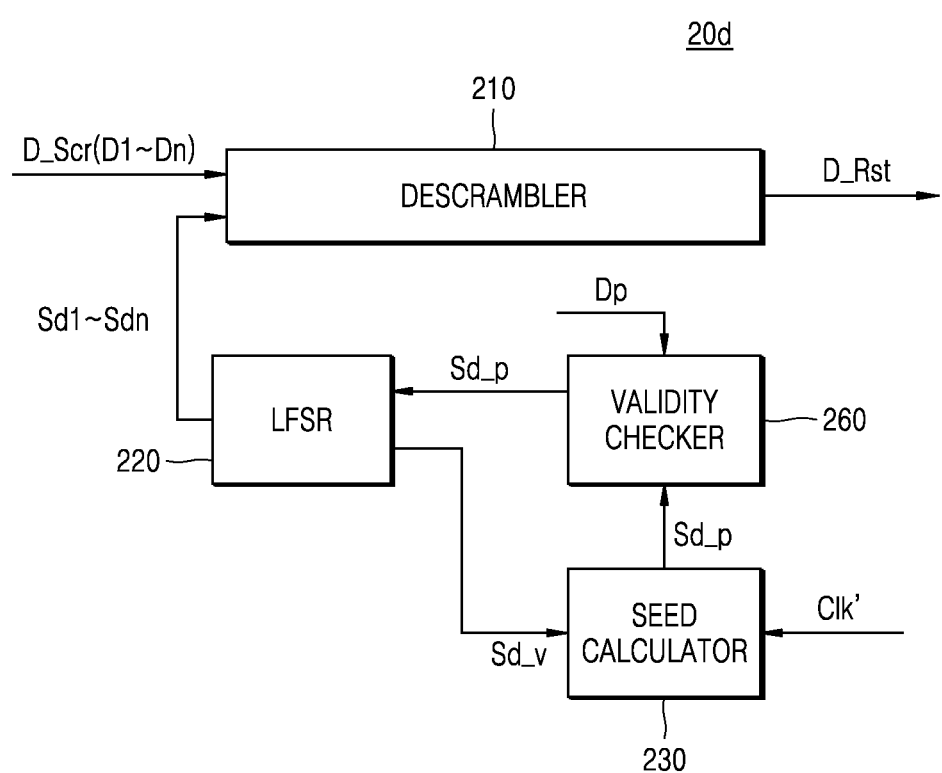
FIG. 10 is a block diagram of a device according to an exemplary embodiment of the inventive concept.

FIG. 10 is a block diagram of a device according to an exemplary embodiment of the inventive concept. In detail, FIG. 10 shows an exemplary embodiment of determining whether a prediction seed is valid. Descriptions provided with reference to FIG. 3 are not provided here again.

Referring to FIG. 10, a device 20d may include the descrambler 210, the LFSR 220, the seed calculator 230, and a validity checker 260. The seed calculator 230 may generate the prediction seed Sd_p based on the valid seed Sd_v and output the generated prediction seed Sd_p to the validity checker 260. The validity checker 260 may receive the scramble data Dp corresponding to the prediction seed Sd_p from outside (e.g., the first device 10 of FIG. 1), and generate restoration data by descrambling the scramble data Dp using the prediction seed Sd_p. According to an exemplary embodiment of the inventive concept, the restoration data corresponding to the prediction seed Sd_p may be predetermined data, and the device 20d may already know a data pattern corresponding to the restoration data D_Rst. As an example, the restoration data may be data in a blank area of a display panel, and the blank area of the display panel may be an area that may not be viewed by a user and a data pattern in the blank area may be predetermined. Accordingly, the device 20d may determine validity of the prediction seed Sd_p by using the data in the blank area.

The validity checker 260 may determine whether the restoration data generated by using the scramble data Dp and the prediction seed Sd_p is identical to predetermined data. When the restoration data is identical to the predetermined data, since the prediction seed Sd_p is a valid seed having no error, the validity checker 260 may output the prediction seed Sd_p to the LFSR 120.

According to an exemplary embodiment of the inventive concept, the validity checker 260 may receive a seed corresponding to the prediction seed Sd_p from the LFSR 220 and compare the seed received from the LFSR 220 to the prediction seed Sd_p of which validity is checked. The validity checker 260 may determine whether to output the prediction seed Sd_p to the LFSR 220 based on a result of the comparing.

As an example, when the seed received from the LFSR 220 is identical to the prediction seed Sd_p, this may indicate that an error has not occurred in the LFSR 220. In this case, the validity checker 260 may not output the prediction seed Sd_p to the LFSR 220.

As another example, when the seed received from the LFSR 220 is different from the prediction seed Sd_p, this may indicate that an error has occurred in the LFSR 220. In this case, the validity checker 260 may output the prediction seed Sd_p to the LFSR 220.

Figure 11:
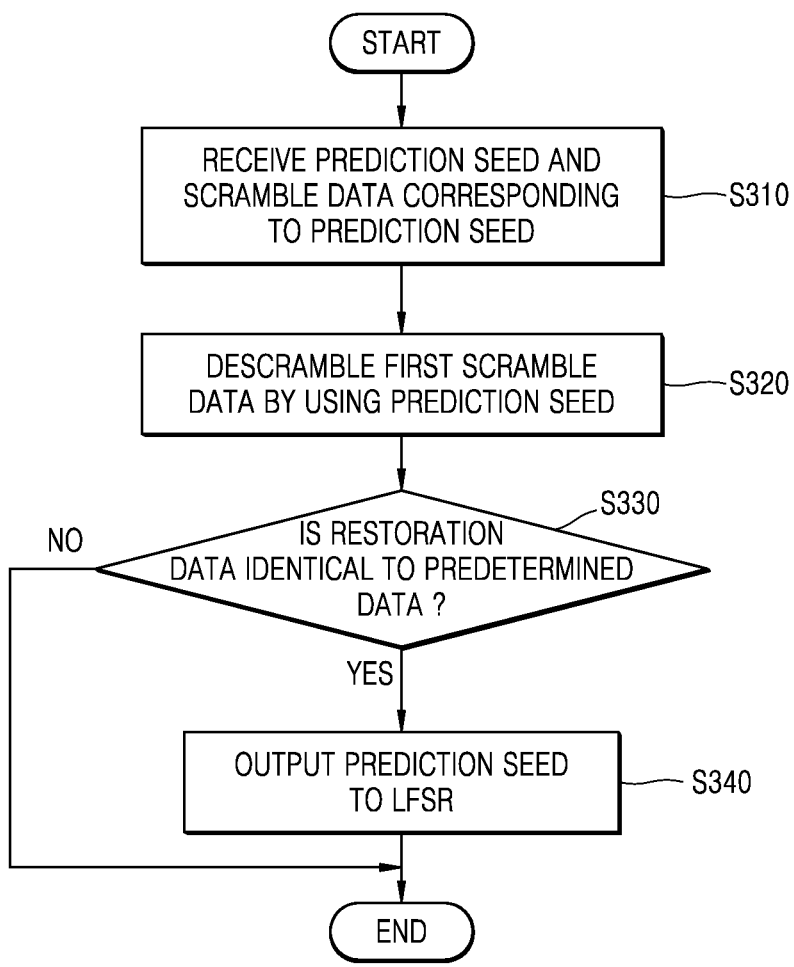
FIG. 11 is a flowchart of operation of a validity checker of FIG. 10 according to an exemplary embodiment of the inventive concept.

FIG. 11 is a flowchart of operation of a validity checker of FIG. 10 according to an exemplary embodiment of the inventive concept.

Referring to FIGS. 10 and 11, the validity checker 260 may receive scramble data Dp corresponding to the prediction seed Sd_p and the prediction seed Sd_p from the seed calculator 230 (in operation S310). The validity checker 260 may generate restoration data by descrambling the scramble data Dp by using the prediction seed Sd_p (in operation S320). The validity checker 260 may determine whether the restoration data is identical to predetermined data corresponding to the prediction seed Sd_p (in operation S330). When the restoration data is identical to the predetermined data corresponding to the prediction seed Sd_p, the validity checker 260 may output the prediction seed Sd_p to the LFSR 220 (in operation S340). Otherwise, when the restoration data is not identical to the predetermined data corresponding to the prediction feed Sd_p, the validity checker 260 may end operation thereof.

Figure 12:
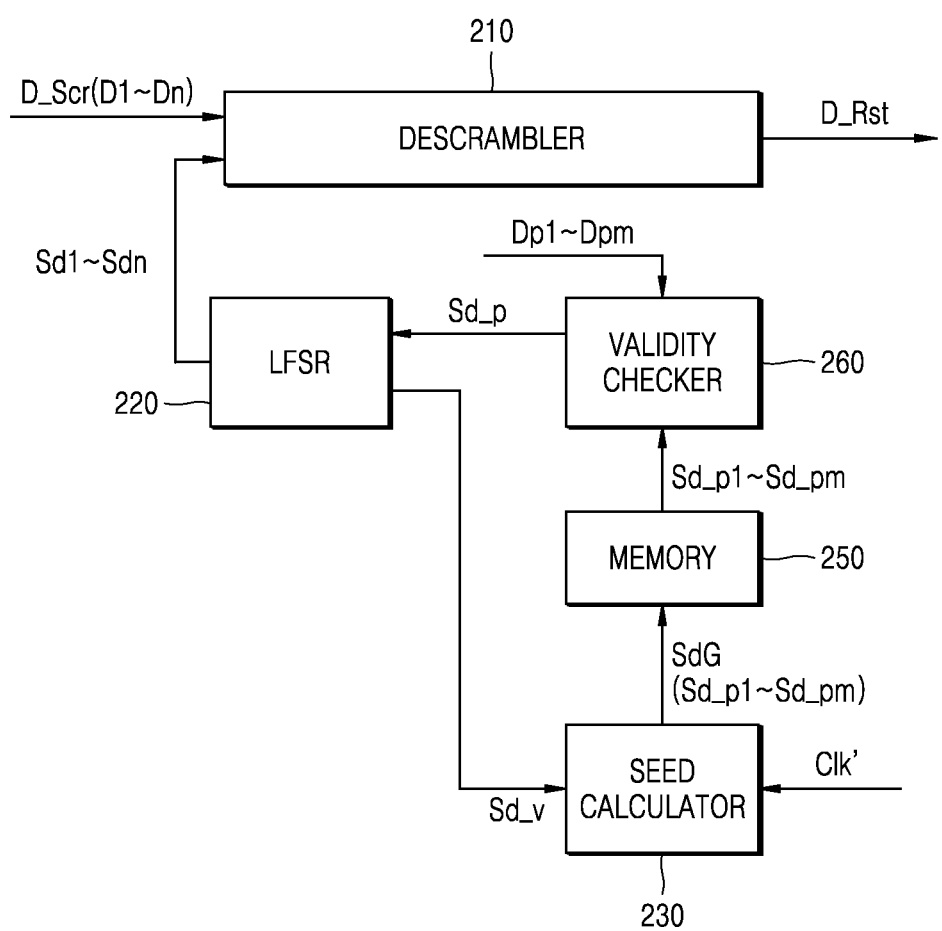
FIG. 12 is a block diagram of a device according to an exemplary embodiment of the inventive concept.

FIG. 12 is a block diagram of a device according to an exemplary embodiment of the inventive concept. Descriptions provided with reference to FIGS. 8 and 10 are not provided here again.

Referring to FIG. 12, a device 20e may include the descrambler 210, the LFSR 220, the seed calculator 230, the memory 250, and the validity checker 260. The seed calculator 230 may generate the prediction seed group SdG including the plurality of prediction seeds Sd_p1 to Sd_pm and store the generated prediction seed group SdG in the memory 250.

The validity checker 260 may receive a plurality of pieces of scramble data Dp1 to Dpm corresponding to the plurality of prediction seeds Sd_p1 to Sd_pm from outside (for example, the first device 10 of FIG. 1) and generate a plurality of pieces of restoration data by descrambling the plurality of scramble data Dp1 to Dpm by using the plurality of prediction seeds Sd_p1 to Sd_pm. According to an exemplary embodiment of the inventive concept, the plurality of pieces of restoration data corresponding to the plurality of prediction seeds Sd_p1 to Sd_pm may be predetermined data.

The validity checker 260 may determine whether the plurality of pieces of scramble data Dp1 to Dpm and the plurality of pieces of restoration data generated by using the plurality of pieces of scramble data Dp1 to Dpm are identical to the predetermined data. Since the prediction seed Sd_p corresponding to restoration data like the predetermined data, among the plurality of restoration data, is a valid seed having no error, the validity checker 260 may output the prediction seed Sd_p to the LFSR 120.

Figure 13:
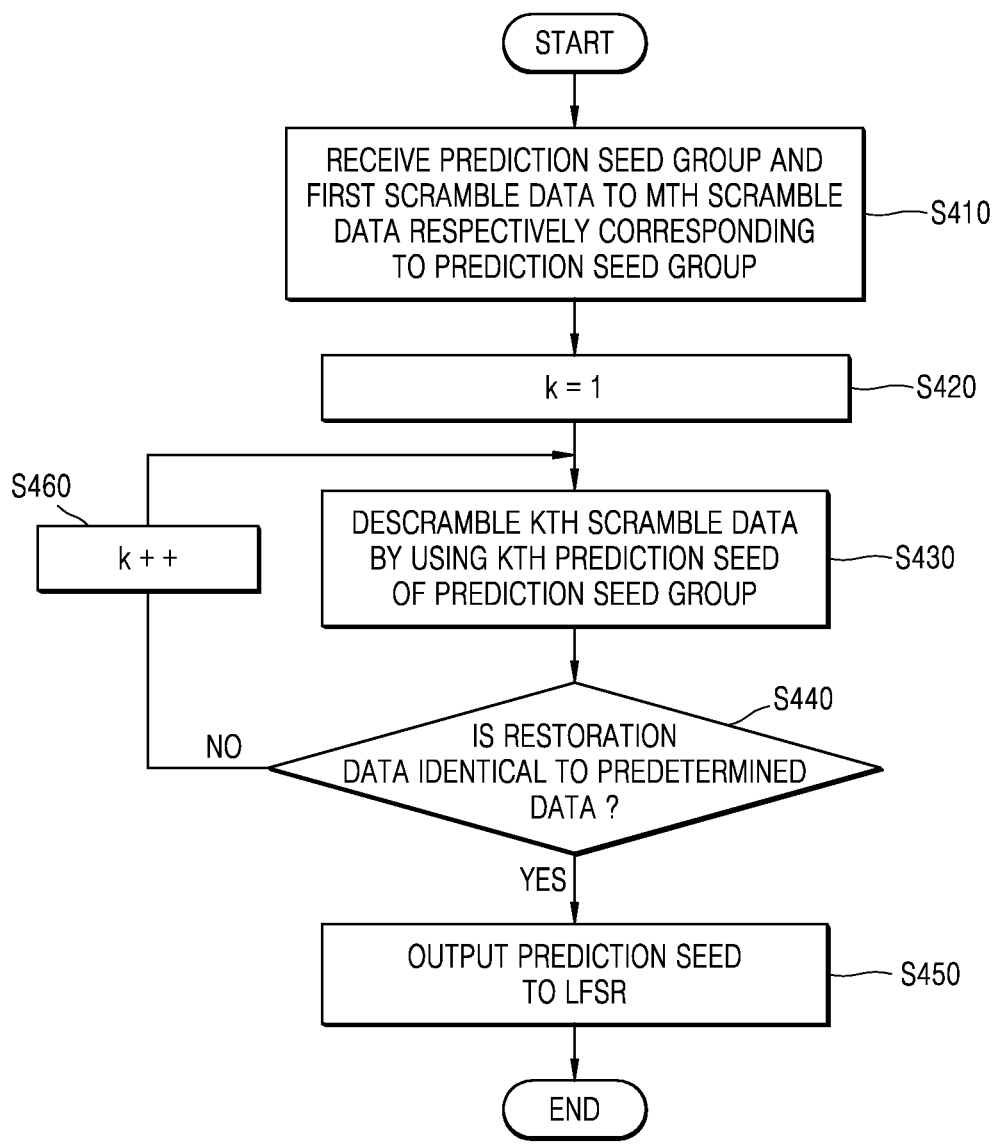
FIG. 13 is a flowchart of operation of a validity checker of FIG. 12 according to an exemplary embodiment of the inventive concept.

FIG. 13 is a flowchart of operation of a validity checker of FIG. 12 according to an exemplary embodiment of the inventive concept.

Referring to FIGS. 12 and 13, the validity checker 260 may receive, from the seed calculator 230, the prediction seed group SdG and the first scramble data Dp1 to mth scramble data Dpm respectively corresponding to the prediction seed group SdG (in operation S410). '1' is substituted as an initial value in a flag value k (in operation S420). The validity checker 260 may generate restoration data by descrambling kth scramble data Dpk by using a kth prediction seed Sd_pk (in operation S430). The validity checker 260 may determine whether the restoration data is identical to predetermined data corresponding to the kth prediction seed Sd_pk (in operation S440).

When the restoration data is identical to the predetermined data corresponding to the kth prediction seed Sd_pk, the validity checker 260 may output the prediction seed Sd_p to the LFSR 220 (in operation S450). Otherwise, when the restoration data is not identical to the predetermined data corresponding to the kth prediction seed Sd_pk, 1 is added to the flag value k (in operation S460), and then, operations S430 and S440 may be repeated.

Figure 14:
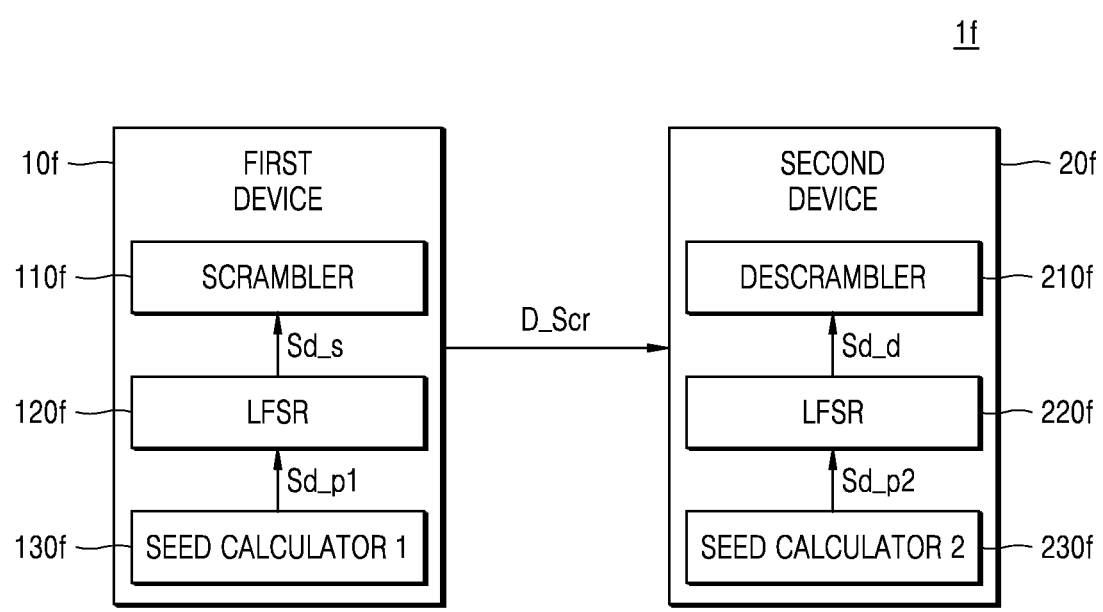
FIG. 14 is a block diagram of a data transceiving system according to an exemplary embodiment of the inventive concept.

FIG. 14 is a block diagram of a data transceiving system according to an exemplary embodiment of the inventive concept. Descriptions provided with reference to FIG. 1 are not provided here again.

Referring to FIG. 14, a data transceiving system if may include a first device 10f and a second device 20f. The first device 10f may include a scrambler 110f, a LFSR 120f, and a first seed calculator 130f. The first seed calculator 130f may output the first prediction seed Sd_p1 to the LFSR 120f. For example, the first seed calculator 130f may output the first prediction seed Sd_p1 calculated based on a separate clock to the LFSR 120f. The LFSR 120f may generate the scrambling seed Sd_s corresponding to a subsequent clock of the separate clock based on the first prediction seed Sd_p1. The scrambler 110f may generate the scramble data D_Scr by scrambling original data by using the first prediction seed Sd_p1 and the scrambling seed Sd_s generated based on the first prediction seed Sd_p1. The scrambler 110f may output the generated scramble data D_Scr to the second device 20f.

The second device 20f may include a descrambler 210f, a LFSR 220f, and a second seed calculator 230f. Since the second device 20f is substantially identical or similar to the second device 20 of FIG. 1, a description thereof is not provided here again.

Figure 15:
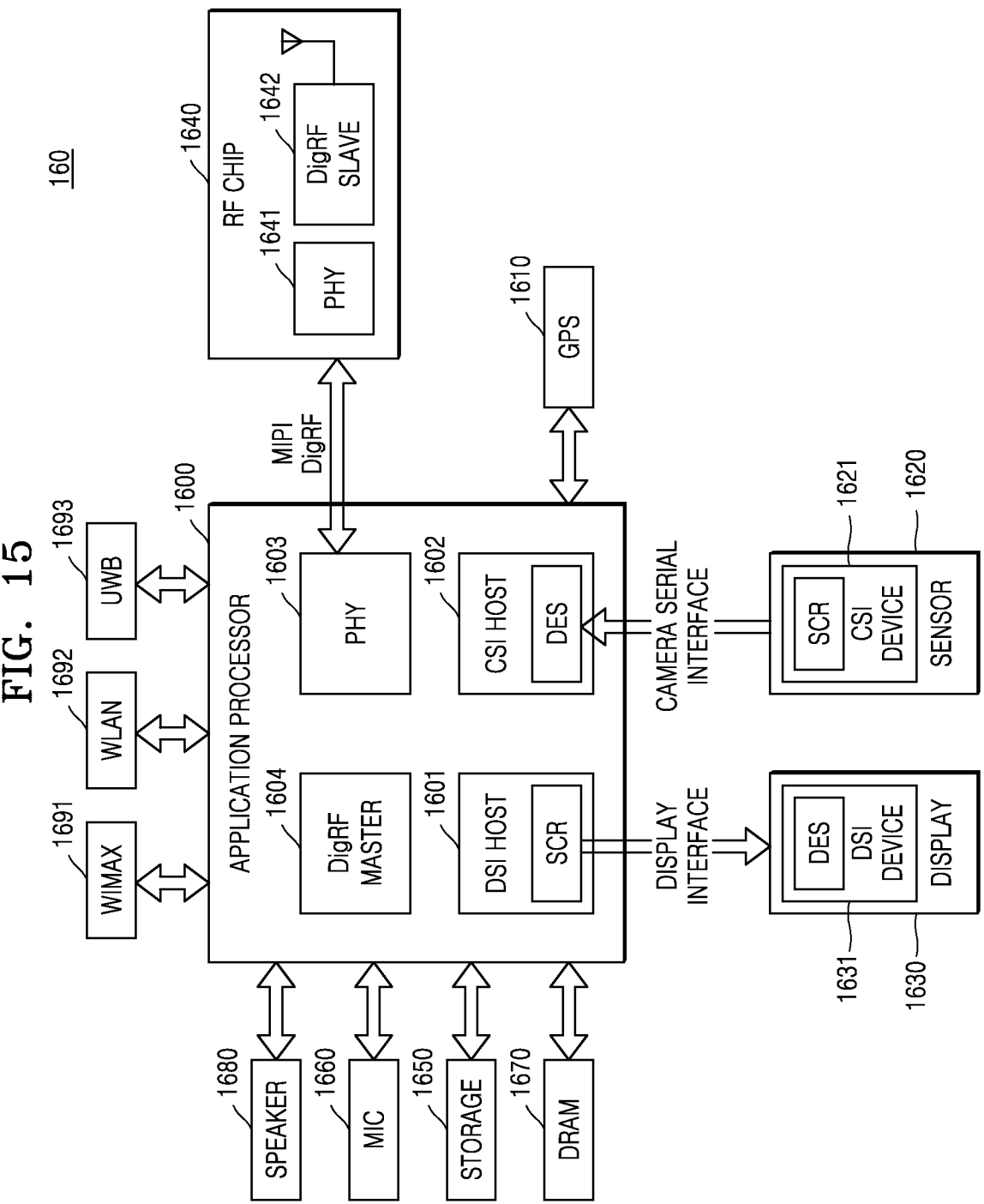
FIG. 15 is a block diagram of an interface used in a computing system according to an exemplary embodiment of the inventive concept.

FIG. 15 is a block diagram of an interface used in a computing system according to an exemplary embodiment of the inventive concept.

Referring to FIG. 15, a computing system 160 may be implemented as a data processing device that may use or support various high-speed serial interfaces (e.g., a mobile industry processor interface (MIPI), an electronic data processor (eDP) interface, a digital processor (DP) interface, a red, green, and blue (RGB) interface, etc.), and include an application processor (AP) 1600, an image sensor 1620, a display 1630, etc. A camera serial interface (CSI) host 1602 of the AP 1600 may perform serial communication with a CSI device 1621 included in the image sensor 1620 via a CSI. According to an exemplary embodiment of the inventive concept, the CSI host 1602 may include a descrambler DES and the CSI device 1621 may include a scrambler SCR.

A display serial interface (DSI) host 1601 of the AP 1600 may perform serial communication with a DSI device 1631 included in the display 1630 via a DSI. The DSI host 1601 may refer to a graphics processor unit (GPU) or an image data source like a driver configured to transmit image data received from the GPU. According to an exemplary embodiment of the inventive concept, the DSI host 1601 may include the scrambler SCR, and the DSI device 1631 may include the descrambler DES. The display 1630 may be implemented to include the device described above with reference to FIGS. 1 to 15. In other words, the display 1630 may calculate a prediction seed and use the calculated prediction seed to descramble scramble data received from the AP 1600. The inventive concept may be applied to all elements using scrambling/descrambling, not only the display 1630.

The computing system 160 may further include a radio frequency (RF) chip 1640 that may communicate with the AP 1600. A physical layer of an Open Systems Interconnection (OSI) model (PHY) 1603 in the AP 1600 and a PHY 1641 in the RF chip 1640 may perform data transception according to mobile industry processor interface (MIPI) DigRF. In addition, the AP 1600 may further include a DigRF MASTER 1604 configured to control data transception according to the MIPI DigRF of the PHY 1603, and the RF chip 1640 may further include a DigRF SLAVE 1642.

The computing system 160 may include a global positioning system (GPS) 1610, a storage 1650, a microphone 1660, dynamic random access memory (DRAM) 1670, and a speaker 1680. In addition, the computing system 160 may perform communication by using ultra wideband (UWB) 1693, a wireless local area network (WLAN) 1692, and worldwide interoperability for microwave access (WIMAX) 1691, etc. However, a structure and an interface of the computing system 160 are just an example and are not limited thereto.

While the inventive concept has been particularly shown and described with reference to exemplary embodiments thereof, it will be understood by one of ordinary skill in the art that various changes in form and details may be made thereto without departing from the spirit and scope of the inventive concept as set forth by the following claims.

What is claimed is:

1. A device for generating restoration data by descrambling scramble data, the device comprising:
   a linear feedback shift register configured to receive a first clock comprising a plurality of edges and sequentially generate a plurality of seeds comprising first to N−1th seeds (where N is a natural number of 2 or greater) respectively corresponding to first to N−1th edges among the plurality of edges;
   a seed calculator configured to calculate an Nth seed corresponding to an Nth edge among the plurality of edges by using the first seed; and
   a descrambler configured to descramble the scramble data by using the plurality of seeds generated by the linear feedback shift register and the Nth seed calculated by the seed calculator,
   wherein the linear feedback shift register is further configured to generate an N+1th seed by using the Nth seed.

2. The device of claim 1, further comprising a clock generator configured to output the first clock sequentially comprising the first to Nth edges to the linear feedback shift register,
   wherein the seed calculator calculates the Nth seed based on a second clock received separately from the first clock received from the clock generator.

3. The device of claim 2, wherein the linear feedback shift register generates a k+1th seed corresponding to a k+1th edge by substituting a kth seed corresponding to a kth edge (where k is a natural number of N or less) in a predetermined first function, and
   the seed calculator counts N that is a number of edges ranging from the first edge corresponding to the first seed to the Nth edge corresponding to the Nth seed based on the separately received second clock, and calculates the Nth seed by repeatedly substituting the first seed in the predetermined first function for N−1 times.

4. The device of claim 2, further comprising a memory storing the Nth seed received from the seed calculator,
   wherein the linear feedback shift register generates the N+1th seed based on the Nth seed received from the memory.

5. The device of claim 4, wherein the seed calculator determines whether the first seed is a valid seed in which an error does not occur and, when the first seed is a valid seed, stores the first seed in the memory.

6. The device of claim 4, wherein the linear feedback shift register generates a k+1th seed corresponding to a k+1th edge by substituting a kth seed corresponding to a kth edge (where k is a natural number of N or less) in a predetermined first function, and
   the seed calculator calculates the Nth seed by repeatedly substituting the first seed in the predetermined first function for N−1 times, calculates an Mth seed by repeatedly substituting the first seed in the predetermined first function for M−1 times (where M is a natural number), and calculates an Lth seed by repeatedly substituting the first seed in the predetermined first function for L−1 times (where L is a natural number).

7. The device of claim 6, wherein the seed calculator stores the calculated Nth seed, the calculated Mth seed, and the calculated Lth seed in the memory, and the descrambler descrambles Nth data, Mth data, and Lth data by using the Nth seed, the Mth seed, and the Lth seed, respectively, received from the memory.

8. The device of claim 6, wherein M is 2N and L is 3N.

9. The device of claim 6, wherein M is N+1 and L is N+2.

10. The device of claim 1, wherein the scramble data comprises first to Nth data, and the descrambler generates the restoration data by performing an exclusive or (XOR) operation on each of the first to Nth seeds and the first to Nth data.

11. The device of claim 1, further comprising a validity checker configured to generate Nth restoration data by using the Nth seed calculated by the seed calculator and Nth data corresponding to the Nth seed, and determine whether the Nth restoration data is identical to predetermined data wherein, when the Nth restoration data is identical to the predetermined data, the validity checker outputs the Nth seed to the linear feedback shift register.

12. The device of claim 11, wherein, when the Nth restoration data is not identical to the predetermined data, the linear feedback shift register generates the Nth seed based on the N−1th seed and outputs the Nth seed to the descrambler.

13. The device of claim 1, wherein the device comprises a display driver integrated circuit configured to drive a display panel.

14. A data transceiving system comprising:

a first device configured to generate and output scramble data comprising first to Nth data (where N is a natural number of 2 or greater) by scrambling original data; and a second device configured to receive the scramble data and decode the scramble data into the original data by descrambling the scramble data, wherein the second device comprises:

a linear feedback shift register configured to receive a first clock comprising a plurality of edges and sequentially generate a plurality of seeds comprising first to N−1th seeds (where N is a natural number of 2 or greater) respectively corresponding to first to N−1th edges among the plurality of edges;

a seed calculator configured to calculate an Nth seed corresponding to an Nth edge among the plurality of edges by using the first seed; and a descrambler configured to descramble the scramble data by using the plurality of seeds generated by the linear feedback shift register and the Nth seed calculated by the seed calculator, wherein the linear feedback shift register generates an N+1th seed by using the Nth seed.

15. The data transceiving system of claim 14, wherein the second device further comprises a clock generator configured to output the first clock sequentially comprising the first to Nth edges to the linear feedback shift register, the linear feedback shift register generates a k+1th seed corresponding to a k+1th edge by substituting a kth seed (where k is a natural number of N or less) corresponding to a kth edge in a predetermined first function, and the seed calculator counts N that is a number of edges ranging from the first edge corresponding to the first seed to the Nth edge corresponding to the Nth seed based on a second clock received separately from the first clock received from the clock generator, and calculates the Nth seed by repeatedly substituting the first seed in the predetermined first function for N−1 times.

16. The data transceiving system of claim 14, wherein the second device further comprises a memory configured to store the Nth seed received from the seed calculator, and wherein the descrambler receives the Nth seed stored in the memory and descrambles the Nth data, and the linear feedback shift register generates the N+1th seed based on the Nth seed received from the memory.

17. The data transceiving system of claim 16, wherein the seed calculator determines whether the first seed corresponding to the first edge is a valid seed in which an error does not occur and, when the first seed is a valid seed, stores the first seed in the memory.

18. The data transceiving system of claim 14, further comprising a validity checker configured to generate Nth restoration data by using the Nth seed calculated by the seed calculator and the Nth data corresponding to the Nth seed, and determine whether the Nth restoration data is identical to predetermined data, wherein, when the Nth restoration data is identical to the predetermined data, the validity checker outputs the Nth seed to the linear feedback shift register.

19. A data descrambling method by which original data is decoded by descrambling scramble data comprising first data to Nth data (where N is a natural number), the method comprising:

generating a first seed to a k−1th seed respectively corresponding to the first data to k−1th data (where k is a natural number of N or less) by using a linear feedback shift register;

calculating a kth seed by using the first seed;

storing the kth seed in a memory;

descrambling the first data to the k−1th data by using the first seed to the k−1th seed;

descrambling the kth data by using the kth seed received from the memory; and generating a k+1th seed to an Nth seed from the kth seed received from the memory by using the linear feedback shift register, wherein the linear feedback shift register generates the first seed to the k−1th seed by using a first function, and the calculating of the kth seed comprises calculating the kth seed by substituting the first seed in the first function for k−1 times.

20. The data descrambling method of claim 19, further comprising checking whether the kth data descrambled by using the kth seed received from the memory is valid data, wherein the generating of the first seed to the k−1th seed comprises:

when the kth data is valid data, generating the k+1th seed to the Nth seed by using the kth seed received from the memory; and when the kth data is not valid data, generating the kth seed by using the first function and generating the k+1th seed to the Nth seed by using the generated kth seed.

* * * * *